No. 667,833. Patented Feb. 12, 1901.
C. VANARSDALL.
TONGUE OR POLE SOCKET.
(Application filed Aug. 9, 1900.)

(No Model.)

Witnesses
F. L. Ourand
C. E. Cox

Inventor
Charles Vanarsdall.
By W. F. Fitzgerald
Attorneys

UNITED STATES PATENT OFFICE.

CHARLES VANARSDALL, OF ENUMCLAW, WASHINGTON.

TONGUE OR POLE SOCKET.

SPECIFICATION forming part of Letters Patent No. 667,833, dated February 12, 1901.

Application filed August 9, 1900. Serial No. 26,380. (No model.)

*To all whom it may concern:*

Be it known that I, CHARLES VANARSDALL, a citizen of the United States, residing at Enumclaw, in the county of King and State of Washington, have invented certain new and useful Improvements in Tongue or Pole Sockets; and I do hereby declare the following to be a full, clear, and exact description of the invention, such as will enable others skilled in the art to which it appertains to make and use the same.

My invention relates to an attachment for the end of a pole or tongue of a vehicle; and one object is to provide a safety pole-tip designed to shorten the extreme end of the pole, so that it will not protrude beyond the neck-yoke, and thus be liable to strike the horses, inasmuch as it is well known that when animals are pulling a heavy load they invariably hold their heads low, and a side movement of the tongue if it extended beyond the end of the neck-yoke, as is common, would be very likely to strike the animals in the mouth or upon the head and do considerable damage.

A further object of my invention is to provide a pole tip or socket which may be readily removed from its operative position or easily placed in position upon the tongue as now constructed, since all that is necessary to do is to slightly shorten the end of the tongue as now constructed and fit the same for reception in the tubular end of my attachment, which will be hereinafter more clearly set forth.

Other objects and advantages will be made fully apparent from the following specification considered in connection with the accompanying drawings, of which—

Figure 1:
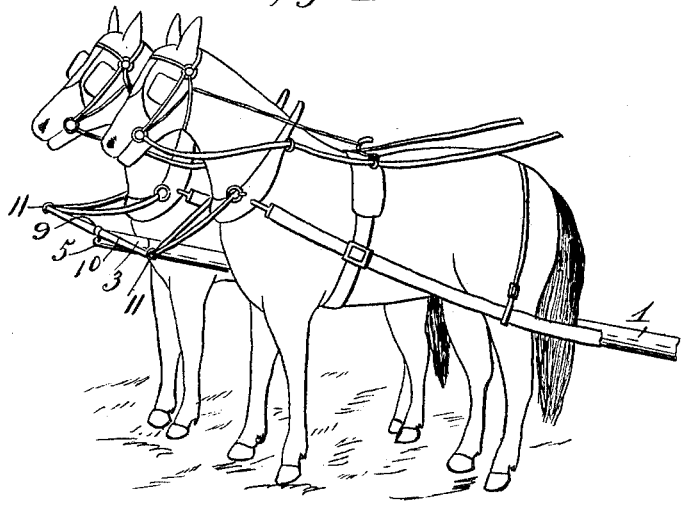
Figure 2:
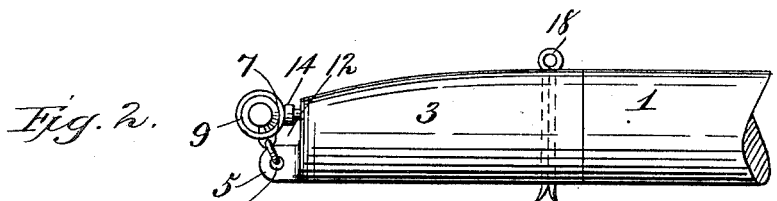
Figure 3:
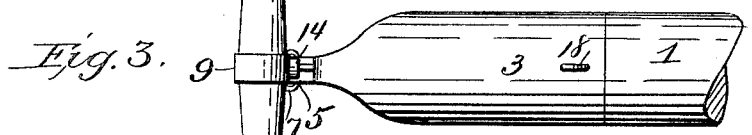
Figure 4:
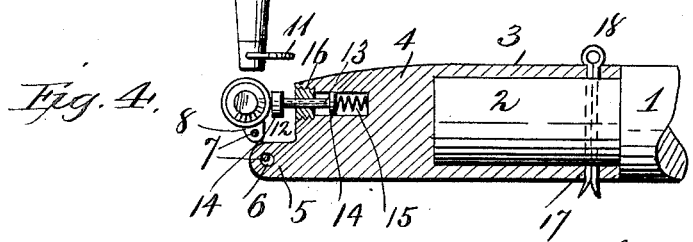

Figure 1 is a perspective view showing my invention as applied to use. Fig. 2 is a side elevation, upon a slightly-enlarged scale, showing the same attached to the end of a tongue. Fig. 3 is a plan view of Fig. 2, illustrating another form of my invention. Fig. 4 is a longitudinal vertical section of Fig. 2.

In order to conveniently refer to the several parts of my invention and their coöperating accessories, 1 indicates the end of the pole or tongue of a vehicle, which may be properly shaped so as to present the dowel 2, as shown in Fig. 4, said dowel being designed to be received by the bore of the rear end of the body-section 3 of my attachment. The front end of the body-section is preferably made solid, as indicated by the numeral 4, while the extreme lower edge thereof is extended forward, so as to provide the ear 5, which is provided with an aperture 6, designed to receive the link 7, by means of which said ear is pivotally connected with the ear 8, formed upon the collar 9 of the neck-yoke 10, the outer ends of the neck-yoke being provided with the rings or links 11, as is common, designed to receive the breast-straps of a harness. By extending the forward end 5, as set forth, a recess or notched opening 12 is left above said extension, said recess being designed to accommodate the middle portion of the neck-yoke, and since the end of the tongue is thus limited in its extension beyond the neck-yoke it follows that the lines or other parts of a harness will not become entangled with or caught by said end, which is a further advantage arising from the use of my improved attachment.

The neck-yoke is designed to swing or rest upon the extension 5, and thus come directly in contact with the end of the tongue proper, 4, or, if preferred, a suitable cushion may be provided in this part of the body 4, designed to receive the neck-yoke, as indicated in Figs. 2 and 4. The cushion which I have provided, against which the neck-yoke may bear, comprises the plunger or bolt 13, having at each end a head 14, the inner head being designed to freely work in a suitable recess provided in the body 4 and bear against a spring 15, disposed in said recess, the bolt being held in place by the bushing-nut 16, through which it is designed to freely play, and since the bolt is held normally outward by the spring 15 it follows that the neck-yoke is provided with a reliably efficient cushion, which will tend to lessen the jars and strain upon the necks of the animals during the use thereof.

By omitting the cushioning device just described the neck-yoke is adapted to bear directly against the forward end of the solid portion 4 above the ear or extension 5, and while I have described my improved cushioning device as above set forth it will be understood that I desire to reserve the right to use my pole attachment without the cushion or with it, as I may deem most desirable in practice—that is to say, in some instances I may wish to manufacture my pole attachment as wholly unprovided with the cushioning device, while in other cases I may wish to employ said cushion or the equivalent thereof—and I therefore wish to retain it or omit it in practice as circumstances may suggest.

It will be understood that my improved attachment may be secured to the tongue in any preferred way, as by passing a bolt 17 through the tubular end, and thereby engaging the dowel or reduced end 2 of the tongue, or my attachment may be readily secured in place, so as to be easily removed, by employing a split key 18, designed to extend through a suitable aperture provided in the attachment and the contiguous portion of the tongue, thereby enabling said key to be readily withdrawn when for any purpose it is desirable to remove my attachment, and I therefore wish to employ either form of fastening device as I may deem most desirable in practice.

Having thus fully described my invention, what I claim as new, and desire to secure by Letters Patent, is—

1. The herein-described attachment for the poles or tongues of vehicles, comprising a tubular section and a solid section, said tubular section being designed to be received by the end of the tongue while the forward end is provided upon its lower side with an extension or ear 5, thereby providing a recess or notch 12 above said ear, and suitable means to pivotally connect the neck-yoke to said ear whereby the neck-yoke will rest in said notch or recess and thereby bear against the solid portion of my attachment, substantially as specified and for the purpose set forth.

2. The herein-described pole attachment comprising the body portion 4 having a tubular extension designed to receive the tongue of a vehicle and upon its outer end an ear 5, a neck-yoke pivotally connected to said ear and a cushioning device carried by said body designed to receive the strain and jars of the neck-yoke incident to use, substantially as specified and for the purpose set forth.

3. A tongue attachment for vehicles comprising a tubular body portion having a solid forward end provided upon its lower side with an ear 5; a neck-yoke and means to pivotally connect said neck-yoke to said ear and a cushioning-spring 15; a plunger-bolt 13 and means to hold said parts in place whereby the jars and strain will be cushioned by said spring substantially as specified and for the purpose set forth.

In testimony whereof I affix my signature in presence of two witnesses.

CHAS. VANARSDALL.

Witnesses:
  A. S. NICKERSON,
  W. F. ECKHART.